(12) United States Patent
Brinda et al.

(10) Patent No.: US 9,282,242 B2
(45) Date of Patent: Mar. 8, 2016

(54) METHOD AND ELECTRIC DEVICE FOR TAKING PANORAMIC PHOTOGRAPH

(75) Inventors: David Brinda, Bellevue, WA (US); Peter Chin, Bellevue, WA (US); Micah Shotel, Bellevue, WA (US); Jye Rong, Taoyuan County (TW); Shu-Ching Ip, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 569 days.

(21) Appl. No.: 13/591,203

(22) Filed: Aug. 21, 2012

(65) Prior Publication Data

US 2013/0050407 A1    Feb. 28, 2013

Related U.S. Application Data

(60) Provisional application No. 61/526,698, filed on Aug. 24, 2011.

(51) Int. Cl.
*H04N 5/232* (2006.01)
*G03B 37/02* (2006.01)

(52) U.S. Cl.
CPC ............ *H04N 5/23238* (2013.01); *G03B 37/02* (2013.01); *H04N 5/23293* (2013.01)

(58) Field of Classification Search
CPC ..................................................... H04N 5/232
USPC .......................................................... 348/38
See application file for complete search history.

(56) References Cited

U.S. PATENT DOCUMENTS

| 2002/0126914 | A1 | 9/2002 | Kotake et al. | |
| 2008/0204566 | A1* | 8/2008 | Yamazaki et al. | 348/208.99 |
| 2009/0021576 | A1* | 1/2009 | Linder et al. | 348/36 |

FOREIGN PATENT DOCUMENTS

| EP | 2018049 | | 1/2009 | |
| EP | 2018049 | A2 * | 1/2009 | ............. H04N 5/232 |
| EP | 2290947 | | 3/2011 | |
| JP | 2000-101895 | | 4/2000 | |
| JP | 2000101895 | A * | 4/2000 | ............. H04N 5/225 |
| JP | 2000101895 | A * | 4/2000 | ............. H04N 5/225 |
| JP | 2007-136163 | | 6/2007 | |
| JP | 2009-60278 | | 3/2009 | |
| JP | 2009060278 | A * | 3/2009 | ............. H04N 5/225 |
| TW | 200516979 | | 5/2005 | |

OTHER PUBLICATIONS

"Search Report of Europe Counterpart Application", issued on Jan. 8, 2013, p. 1-p. 4.
"Office Action of Europe Counterpart Application", issued on Jan. 15, 2013, p. 1-p. 6.
"Office Action of Taiwan Counterpart Application", issued on Jun. 25, 2014, p. 1-p. 4.

* cited by examiner

*Primary Examiner* — Jefferey Harold
*Assistant Examiner* — Justin Sanders
(74) *Attorney, Agent, or Firm* — Jianq Chyun IP Office

(57) ABSTRACT

A method for an electric device to take a panoramic photograph is provided and the method includes following steps. A first image is captured. A first line is displayed on a preview window. A first graphical object and a second graphical object are displayed on the first line. Posture information of the electric device is obtained. The second graphical object is moved along the first line according to the posture information. It is determined if the electric device is panned horizontally or tilted vertically according to the first line. A second image is captured if the second graphical object reaches the first graphical object and the electric device is panned horizontally or tilted vertically. The panoramic photograph is generated according to the first image and the second image. Accordingly, a user obtains a panoramic photograph easily.

12 Claims, 8 Drawing Sheets

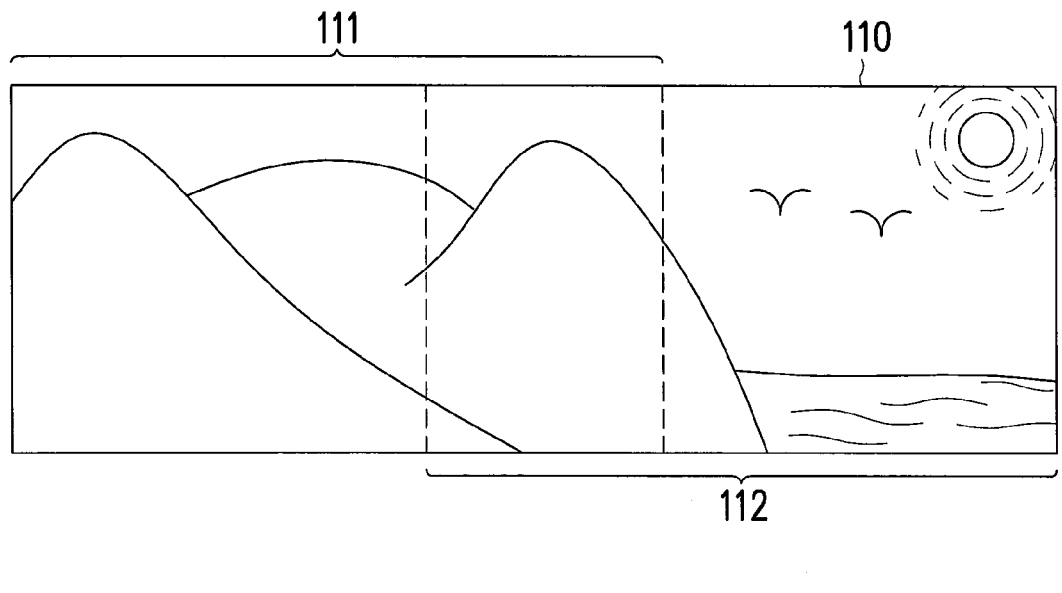
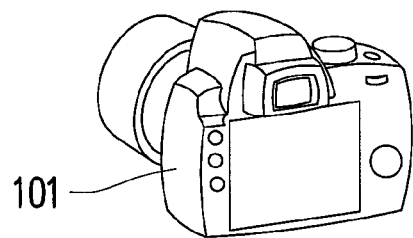
FIG. 1 (RELATED ART)
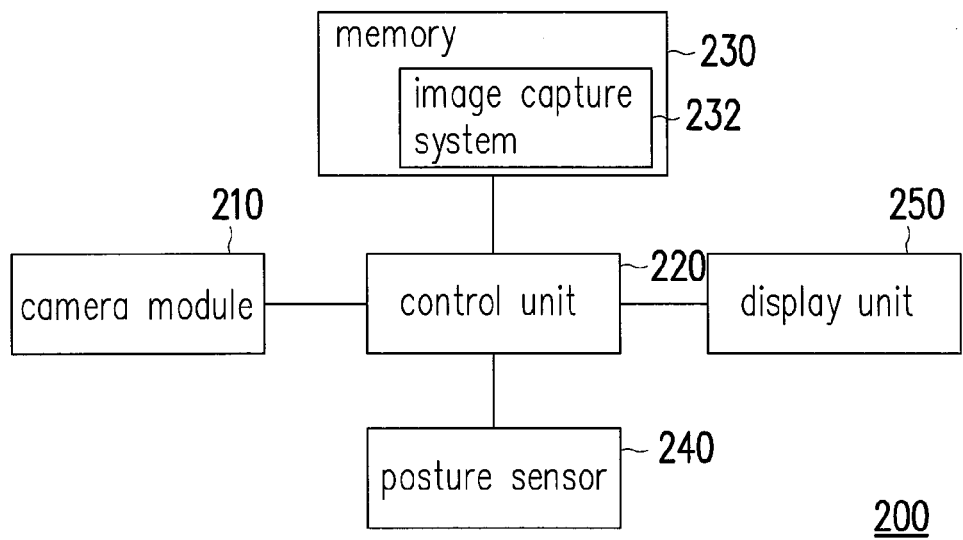
FIG. 2

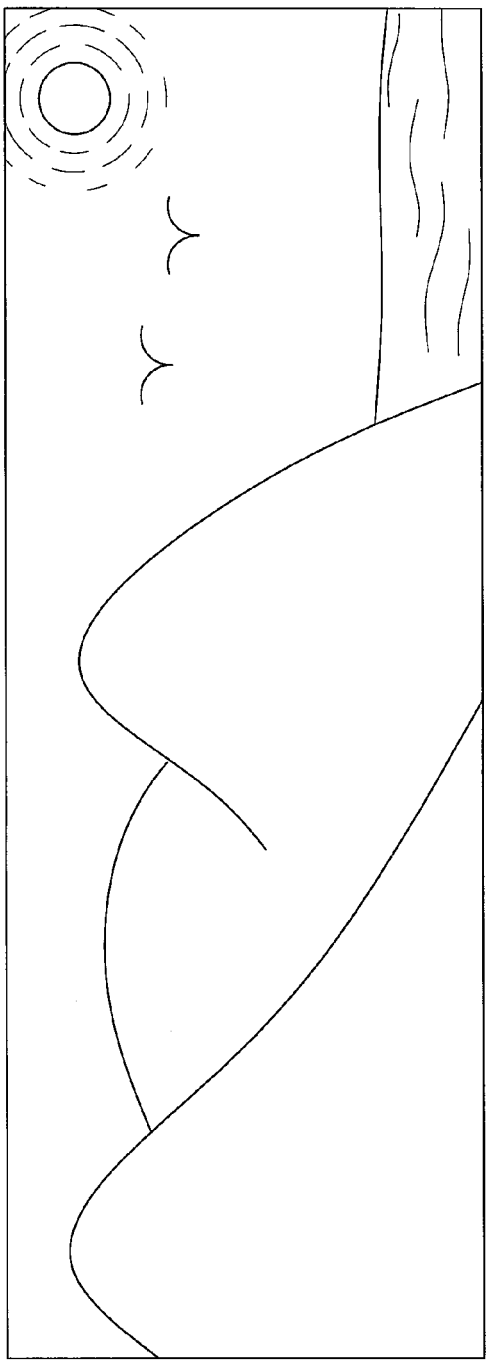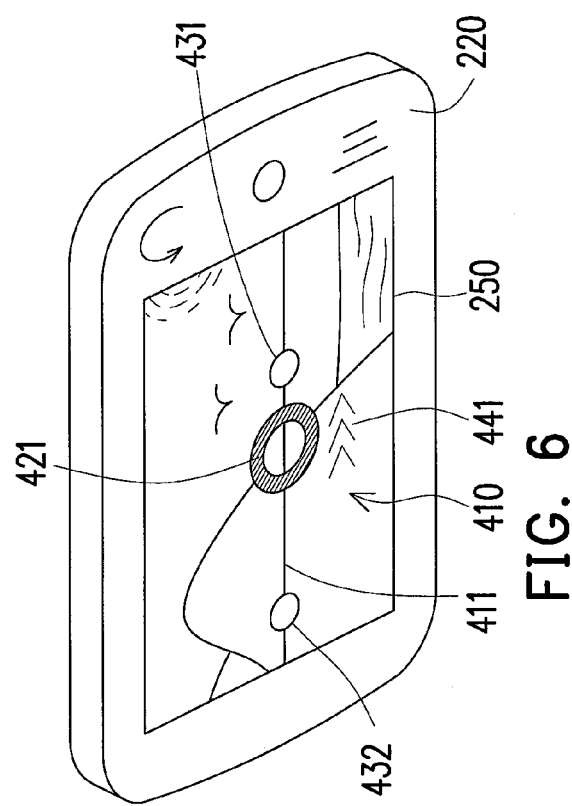
FIG. 6

ID OF TAKING PANORAMIC PHOTOGRAPH

CROSS-REFERENCE TO RELATED APPLICATION

This application claims the priority benefit of U.S. provisional application Ser. No. 61/526,698, filed on Aug. 24, 2011. The entirety of the above-mentioned patent application is hereby incorporated by reference herein and made a part of this specification.

BACKGROUND

1. Technology Field

The invention generally relates to a method and an electric device for taking a panoramic photograph.

2. Description of Related Art

A panoramic photograph is an image with wide fields of view. Typically, a panoramic photograph is made by capturing multiple images first. The images are captured by panning a camera at regular angles such that the images are partially overlapped. Features of each of the images are extracted, and some points distributed at different images are matched by comparing the features. After finding the matched points, these images are stitched together to generate a panoramic photograph. A significant step when taking a panoramic photograph is to align images. If the images are not aligned appropriately, the panoramic photograph may not be continuous, or cannot be made at all.

FIG. 1 is a schematic diagram illustrating a concept to take a panoramic photograph. As shown in FIG. 1, to take a panoramic photograph 110, a user needs to pan the camera 101 to capture an image of field 111, then pan the camera 101 to capture an image of field 112, such that the two captured image are partially overlapped. However, how to pan the camera 101 appropriately needs some photographic skills. Therefore, how to help a user to take a panoramic photograph is an issue in the art.

SUMMARY

The embodiments of the invention provide a method and an electric device for taking a panoramic photograph, in which a user may easily obtain a panoramic photograph.

According to an embodiment of the invention, a method for an electric device to take a panoramic photograph is provided. The method comprises: capturing a first image; displaying a first line on a preview window; displaying a first graphical object and a second graphical object on the first line; obtaining posture information of the electric device; moving the second graphical object along the first line according to the posture information; determining if the electric device is panned horizontally or tilted vertically according to the first line; capturing a second image when the second graphical object reaches the first graphical object and if the electric device is panned horizontally or tilted vertically; and generating the panoramic photograph according to the first image and the second image.

In an embodiment, the method further comprises: displaying a second line through the first graphical object on the preview window; and rotating the second line about the first graphical object according to a rotation angle of the posture information.

In an embodiment, the step of moving the second graphical object along the first line according to the posture information further comprises: displaying a third graphical object on the preview window, wherein the third graphical object indicates a first direction opposite to the direction that the second graphical object is moved.

In an embodiment, after the step of moving the second graphical object along the first line according to the posture information, the method further comprises: obtaining second posture information of the electric device; generating a second direction according to the second posture information; determining if the second direction is the same with the first direction; and if the second direction is not the same with the first direction, displaying an error message on the preview window.

In an embodiment, the method further comprises: obtaining a moving velocity of the electric device according to the posture information; determining if the moving velocity is larger than a velocity threshold; if the moving velocity is larger than the velocity threshold, displaying an error message on the preview window.

In an embodiment, the step of capturing the second image when the second graphical object reaches the first graphical object further comprises: displaying a pausing sign on the preview window.

In an embodiment, the step of displaying the first graphical object and the second graphical object on the first line comprises: displaying the first graphical object at the center of the first line, and displaying the second graphical object at an end of the first line.

From another aspect, an embodiment provides an electric device for taking a panoramic photograph. The electric device comprises a camera module, a display unit, a posture sensor, and a control unit. The camera module is configured to capture a first image. The display unit is configured to display a preview window. The posture sensor is configured to obtain posture information of the electric device. The control unit is coupled to the camera module, the display unit, and the posture sensor, and is configured to display a first line on the preview window. The control unit is also configured to display a first graphical object and a second graphical object on the first line, to move the second graphical object along the first line according to the posture information, and determine if the electric device is panned horizontally or tilted vertically according to the first line. The control unit is also configured to control the camera module to capture a second image if the second graphical object reaches the first graphical object and if the electric device is panned horizontally or tilted vertically according, and to generate the panoramic photograph according to the first image and the second image.

In an embodiment, the control unit is further configured to display a second line through the first graphical object on the preview window, and rotate the second line about the first graphical object according to a rotation angle of the posture information.

In an embodiment, the control unit is further configured to display a third graphical object on the preview window, and the third graphical object indicates a first direction opposite to the direction that the second graphical object is moved.

In an embodiment, the posture sensor is further configured to obtain second posture information of the electric device. The control unit is further configured to generate a second direction according to the second posture information, determine if the second direction is the same with the first direction, and display an error message on the preview window if the second direction is not the same with the first direction.

In an embodiment, the control unit is further configured to obtain a moving velocity of the electric device according to the posture information, determining if the moving velocity is larger than a velocity threshold, and display an error message on the preview window if the moving velocity is larger than the velocity threshold.

In an embodiment, the control unit is further configured to display a pausing sign on the preview window.

In an embodiment, the control unit is further configured to display the first graphical object at the center of the first line, and display the second graphical object at an end of the first line.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic diagram illustrating a concept to take a panoramic photograph.

FIG. 2 is a block diagram of an electric device according to one embodiment.

FIGS. 5 to 7 are schematic diagrams illustrating the panning of the electric device according to an embodiment.

DESCRIPTION OF THE EMBODIMENTS

Figure 3:
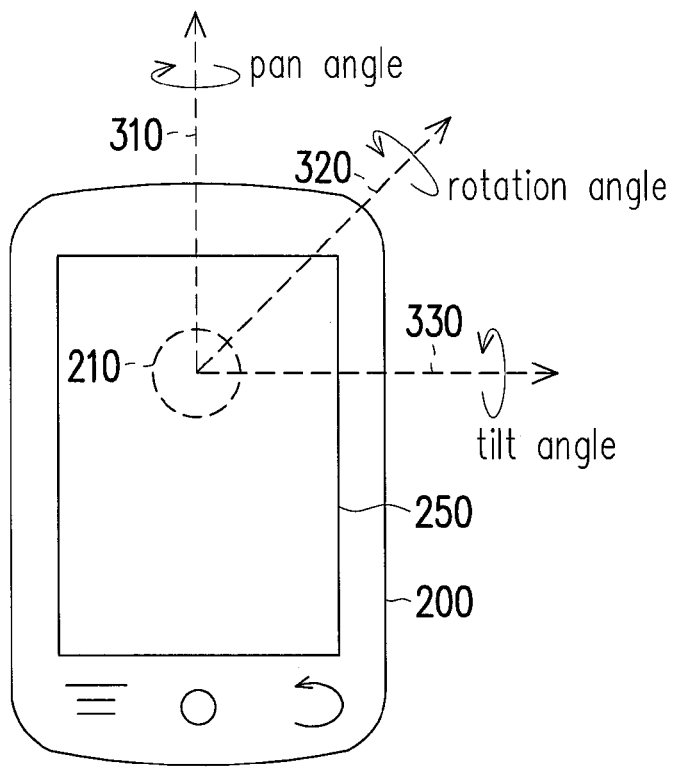
FIG. 3 is a schematic diagram illustrating pan angle, tilt angle, and rotation angle according to one embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 2 is a block diagram of an electric device according to one embodiment.

Referring to FIG. 2, the electric device 200 includes a camera module 210, a control unit 220, a memory 230, a posture sensor 240, and a display unit 250. For example, the electric device 200 is implemented as a digital camera, a smart phone, or a laptop, but the invention is not limited thereto.

The camera module 210 is configured to capture images. For example, the camera module 210 includes a lens and an image sensor such a charge coupled device (CCD) or a complementary metal oxide semiconductor (CMOS) sensor.

The control unit 220 is configured to control overall operations of the electric device 200. For example, the control unit 220 is a central processing unit (CPU), a microprocessor, or an application specific integrated circuit (ASIC).

The memory 230 is configured to store programs and images. In the embodiment, the memory 230 stores an image capture system 232. The image capture system 232 includes a number of instructions, which provides functions of taking a panoramic photograph.

The display unit 250 is configured to display a preview window. The control unit 220 displays messages, graphical objects on the preview window to help a user take a panoramic photograph. In the embodiment, an image the camera module 210 is about to capture is rendered on the preview window in real time, but the invention is not limited thereto.

The posture sensor 240 is configured to sense posture information of the electric device 200. For example, the posture sensor 240 is a gyroscope, and the sensed posture information includes a pan angle, a tilt angle and a rotation angle.

FIG. 3 is a schematic diagram illustrating pan angle, tilt angle, and rotation angle according to one embodiment.

Referring to FIG. 3, the electric device 200 is implemented as a smart phone, the display unit 250 is disposed in the front side of the smart phone, and the camera module 210 is disposed in the back side of the smart phone. A user rotates the electric device 200 in a 3-dimension space. Herein, "tilt angle" is referred to the angle that the electric device 200 is rotated along the axis 330 (i.e. x axis); "rotation angle" is referred to the angle that the electric device 200 is rotated along the axis 320 (i.e. y axis); and "pan angle" is referred as the angle that the electric device 200 is rotated along the axis 310 (i.e. z axis). The posture sensor 240 obtains posture information continuously, and transmits the obtained posture information to the control unit 220.

Figure 4:
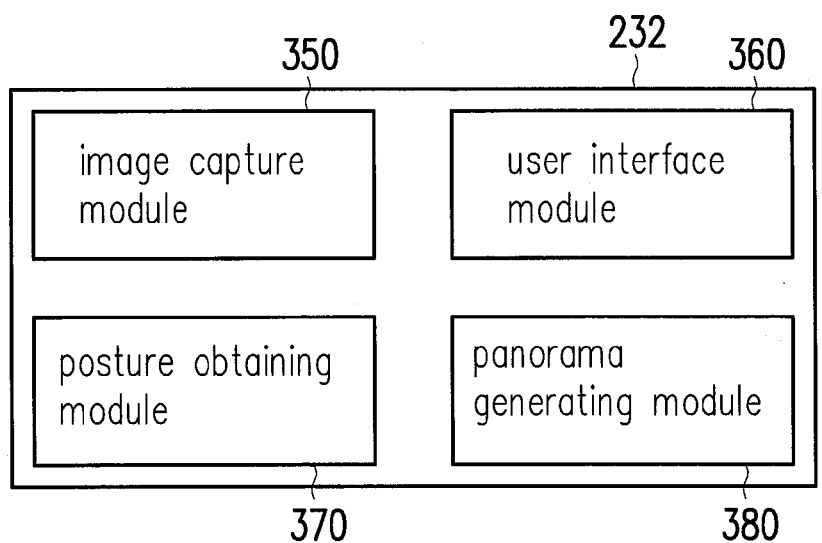
FIG. 4 is a block diagram illustrating an image capture system according to one embodiment.

FIG. 4 is a block diagram illustrating an image capture system according to one embodiment.

Referring to FIG. 4, the image capture system 232 includes an image capture module 350, a user interface module 360, a posture obtaining module 370 and a panorama generating module 380.

The control unit 220 executes the image capture module 350 to obtain images captured from the camera module 210. The control unit 220 executes the user interface module 360 to render a graphical interface on the display unit 250. The control unit 220 executes the posture obtaining module 370 to obtain posture information sensed by the posture sensor 240. The control unit 220 executes the panorama generating module 380 to generate a panoramic photograph. When describing operations of the image capture module 350, the user interface module 360, the posture obtaining module 370 and the panorama generating module 380 hereinafter, it represents the operations are executed by the control unit 220, and it will not be repeated.

Figure 5:
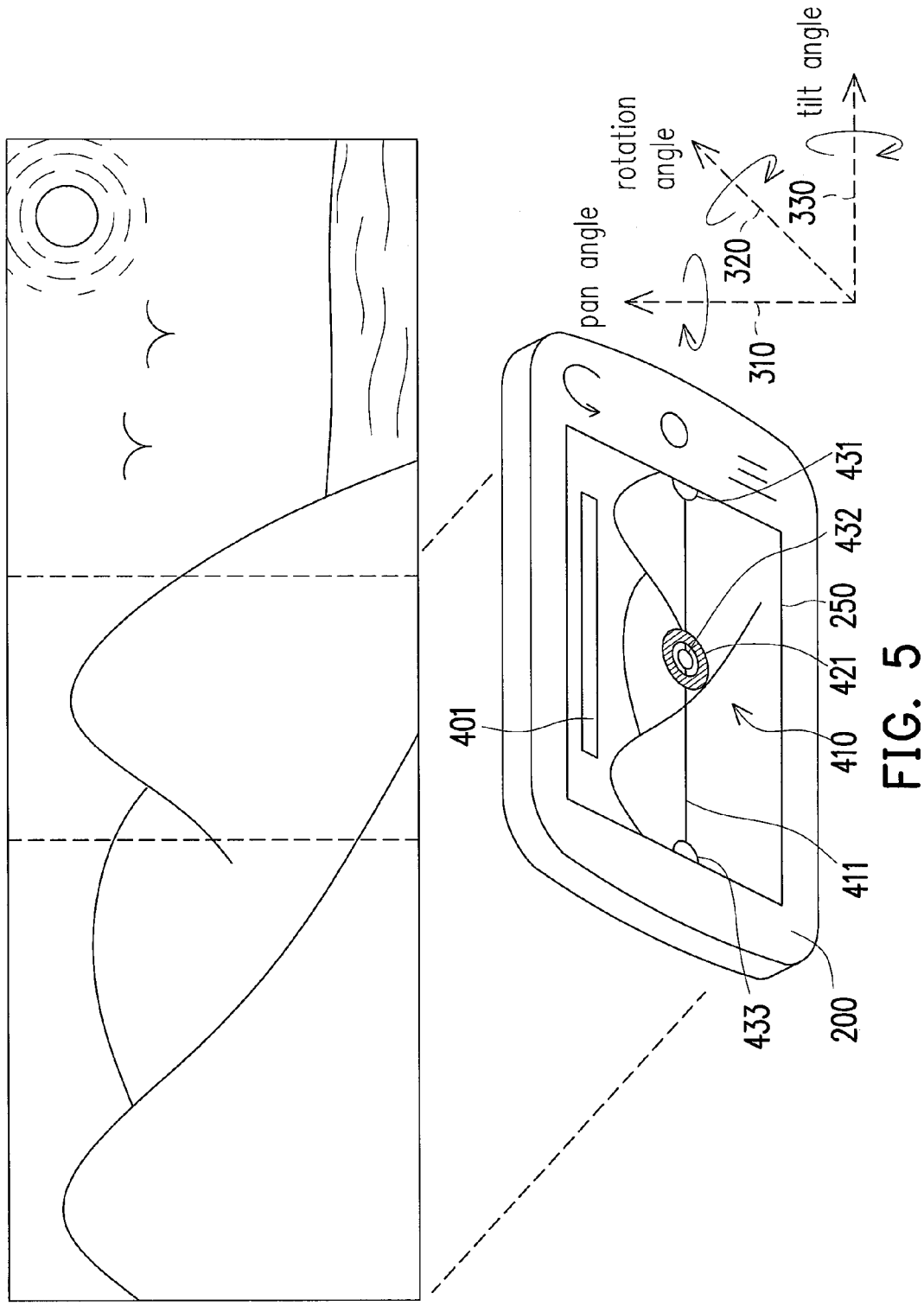
Figure 7:
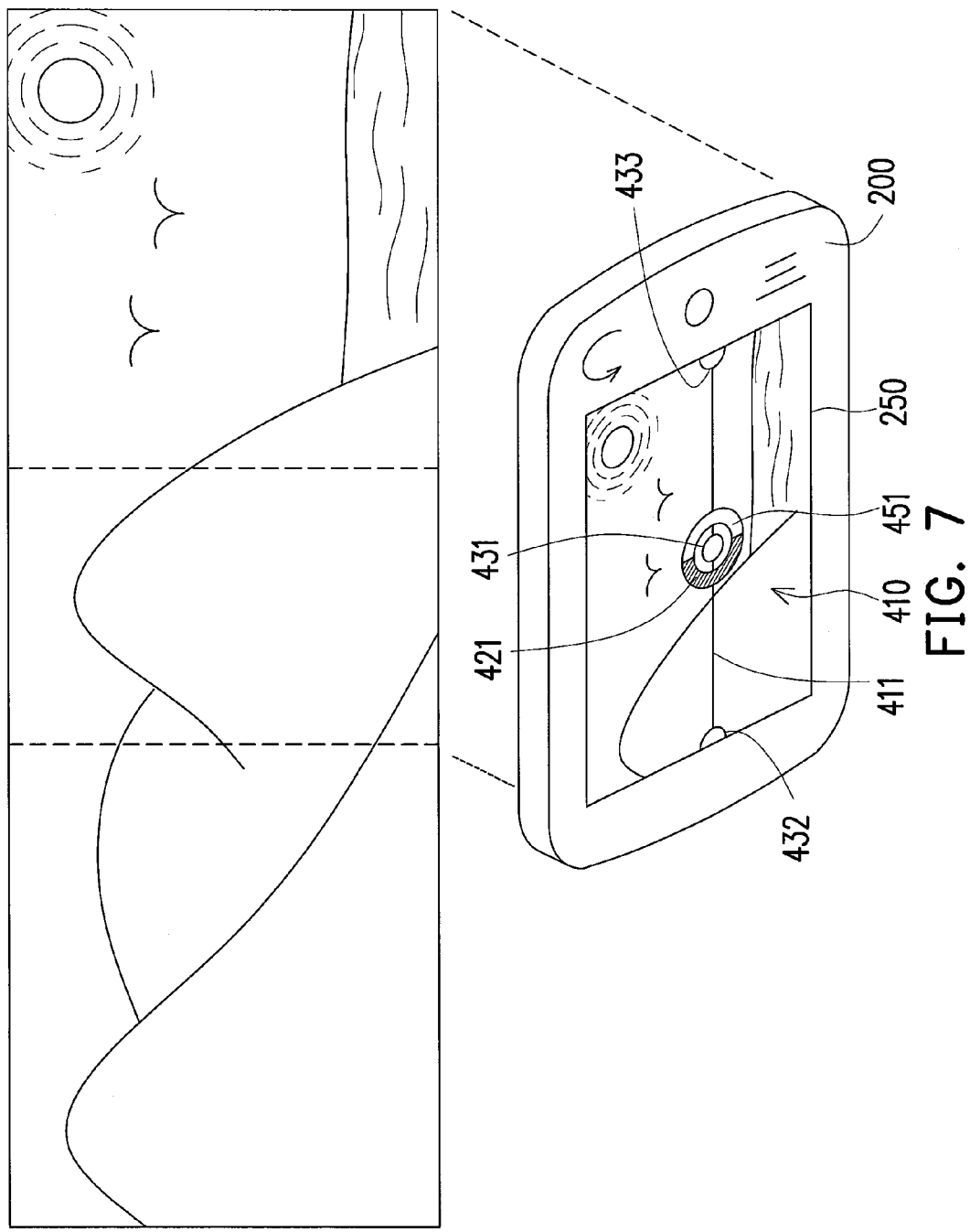

FIGS. 5 to 7 are schematic diagrams illustrating the panning of the electric device according to an embodiment.

Referring to FIG. 5, when a user enters a panorama mode, the user interface module 360 generates a preview window 410 on the display unit 250, and renders an image which the camera module 210 is about to capture in the preview window 410. The user interface module displays a message 401, for example, the content of the message 401 is "Press the camera button to start Panorama shot". The user interface module 360 displays a line 411 horizontally across the preview window 410. The user interface module 360 also displays a graphical objects 421 (also referred as a first graphical object), and graphical objects 431~1433 (also referred as second graphical objects) on the line 411.

In the embodiment shown in the FIG. 5, the user holds the electric device 200 horizontally; therefore, the electric device 200 is in a landscape view. The pan angles, the rotation angles, and the tilt angles in the FIG. 5 corresponds to axis 310, 320 and 330, respectively. In the embodiment, the shape of the graphical object 421 is a ring, and the shapes of the graphical objects 431~433 are circles, but the invention does not limit the shapes of the graphical object 431~433 and 421. In the embodiment, the graphical object 421 is displayed at the center of the line 411, and the graphical object 431 and 433 are displayed at ends of the line 411. However, in other embodiments, the graphical object 431~432 and 421 may be displayed at any position on the line 411.

After the user presses a camera button, the image capture module 350 obtains the captured image (also referred as a first image). Then, the user may pan the electric device 200 to capture the next image. When the user pans the electric device 200, the posture obtaining module 370 obtains a pan angle of the electric device 200, and the user interface module 360 moves the graphical objects 431~433 according to the pan angle.

Referring to FIG. 6, when the user pans the electric device right, the user interface module 360 moves the graphical objects 431 and 432 along the line 411 from right to left. Note that the location of the graphical object 421 is fixed on the line 411. The user interface module 360 also displays a graphical object 441 to indicate a direction (also referred as a first direction) that the user is panning. In other words, the direction which the graphical object 441 indicates is opposite to the direction that the graphical objects 431 and 432 are moved. Since the image which the camera module 210 is about to capture is changed in real time while the electric device is being panned, the content shown in the preview window 410 looks like the graphical object 421 is moving. The graphical object 431 indicates the location where the user should stop panning.

While the user is panning the electric device 200, the posture obtaining module 370 keep obtaining posture information (also referred as second posture information) of electric device 200. The posture obtaining module 370 generates a second direction according to the second posture information. The second direction indicates the direction that the electric device 200 is being tilted/panned. The posture obtaining module 370 determines if the second direction is different from the direction which the graphical object 441 indicates and the electric device 200 is tilted/panned along the second direction over a threshold. If yes, the user interface module 360 will display an error message. For example, if the user first pans the electric device 200 right and then pans left over the threshold, the user interface module 360 will display the error message. Alternatively, if the user first pans the electric device 200 right and then tilts the electric device 200 upward or downward over the threshold, the user interface module 360 will display the error message as well. In other words, the user should keep panning the electric device 200 in the same direction, or an error message will be displayed.

In one embodiment, while the user is panning the electric device 200, the posture obtaining module 370 also obtains a moving velocity of the electric device 200 according to the obtained posture information. The moving velocity indicates how fast the user is panning the electric device 200. The posture obtaining module 370 determines if the moving velocity is larger than a velocity threshold. If yes, the user interface module 360 will display an error message in the preview window 410. For example, the content of the error message is "Oops, please pan the camera smoothly and try again".

Referring to FIG. 7, when the user pans the electric device 200 at an appropriate angle, the graphical object 431 reaches the graphical object 421. The posture obtaining module also determines if the electric device 200 is panned horizontally according to the line 411 and the obtained posture information. For example, if the electric device 200 is not panned horizontally, the user will see that the line 411 is not in parallel with sky line. The image capture module 350 will control the camera module 210 to capture an image (also referred as a second image) automatically if the graphical object 431 reaches the graphical object 421 and the electric device 200 is panned horizontally. During capturing the image, the user interface module 360 displays a pausing sign 451. In the embodiment, the pausing sign 451 is moving around the graphical object 421 until the capture is done. However, in other embodiment, the pausing sign 451 may be at other locations in the preview window 410. Alternatively, the pausing sign 451 may be implemented as a message. The invention is not limited thereto. After the capture is done, the user may press a check button, and the panorama generating module 380 generates a panoramic photograph by stitching the two captured images (i.e. the first image and the second image). While the panorama generating module 380 is generating the panoramic photograph, the user interface module 360 displays a message on the preview window 410. For example, the content of the message is "Stitching photos". After the panoramic photograph is generated, it represents the panorama mode ends. The user interface module 360 generates a review screen on the display unit 250, and displays the generated the panoramic photograph in the review screen.

In one embodiment, some settings are limited during the panorama mode. For example, flashlight is disabled; film speeds, brightness, and exposure are set to auto; touch focus/capture is not available during the panorama mode.

In another embodiment, the panorama generating module 380 sets an image limit. The number of the images to be stitched cannot exceed the image limit. Therefore, during the panorama mode, the panorama generating module calculates the number of captured images. If the number of the captured images exceeds the image limit, the panorama generating module 380 will start stitching the captured images automatically. For example, the image limit is 3, but the invention is not limited thereto.

If the panoramic photograph needs not to be generated yet, the user may pans the electric device 200 further to capture another image. For example, the user interface module 360 displays a graphical object 433 to indicate where to capture the next image. The user may pans the electric device 200 right so that the graphical object 433 will be moved from right to left.

Figure 8:
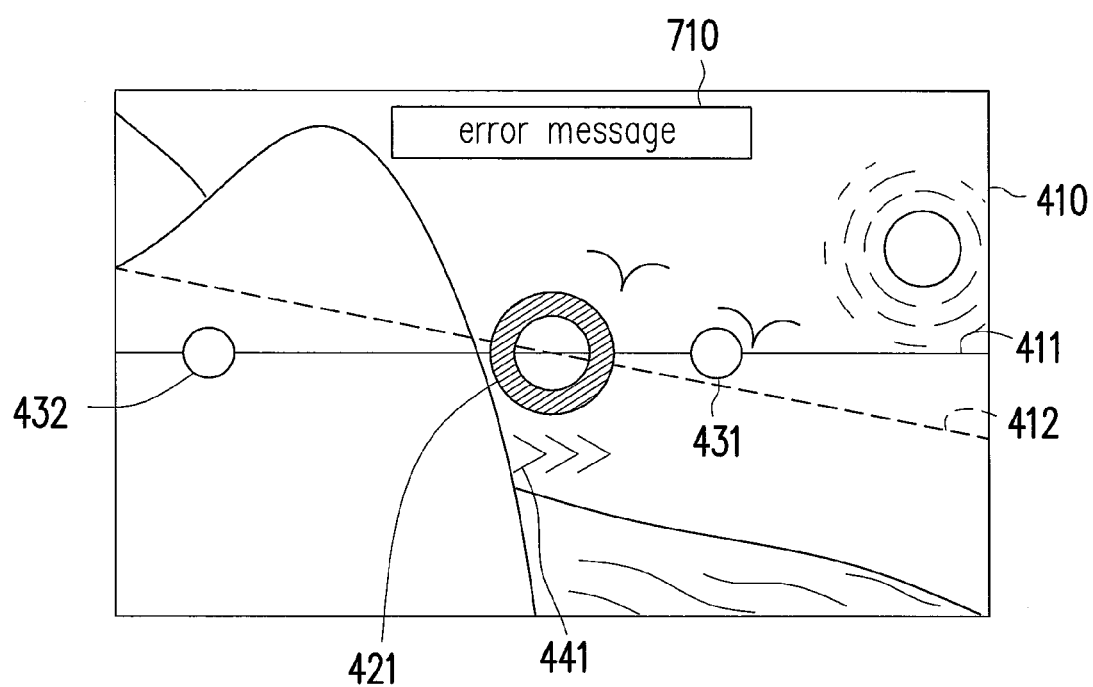
FIG. 8 is a schematic diagram illustrating the preview window when the electric device is rotated.

FIG. 8 is a schematic diagram illustrating the preview window when the electric device is rotated.

Referring to FIG. 8, in one embodiment, the user interface module 360 displays line 412 though the graphical object 421. The posture obtaining module 370 obtains a rotation angle of the electric device 200, and the user interface module 360 rotates the line 412 about the graphical object 421 according to the rotation angle. As shown in the FIG. 7, the user rotates the electric device 200 clockwisely, so that the line 412 is rotated clockwisely about the graphical object 421. The posture obtaining module 370 determines if the rotation angle is larger than a rotation threshold. If the rotation angle is larger than the rotation threshold, the user interface module 360 will display an error message 710 to tell the user he/she is off the line 411. Note that the line 412 may be display with the line 411 in FIGS. 5 to 7. The invention does not limit when the line 412 is displayed.

Figure 9:
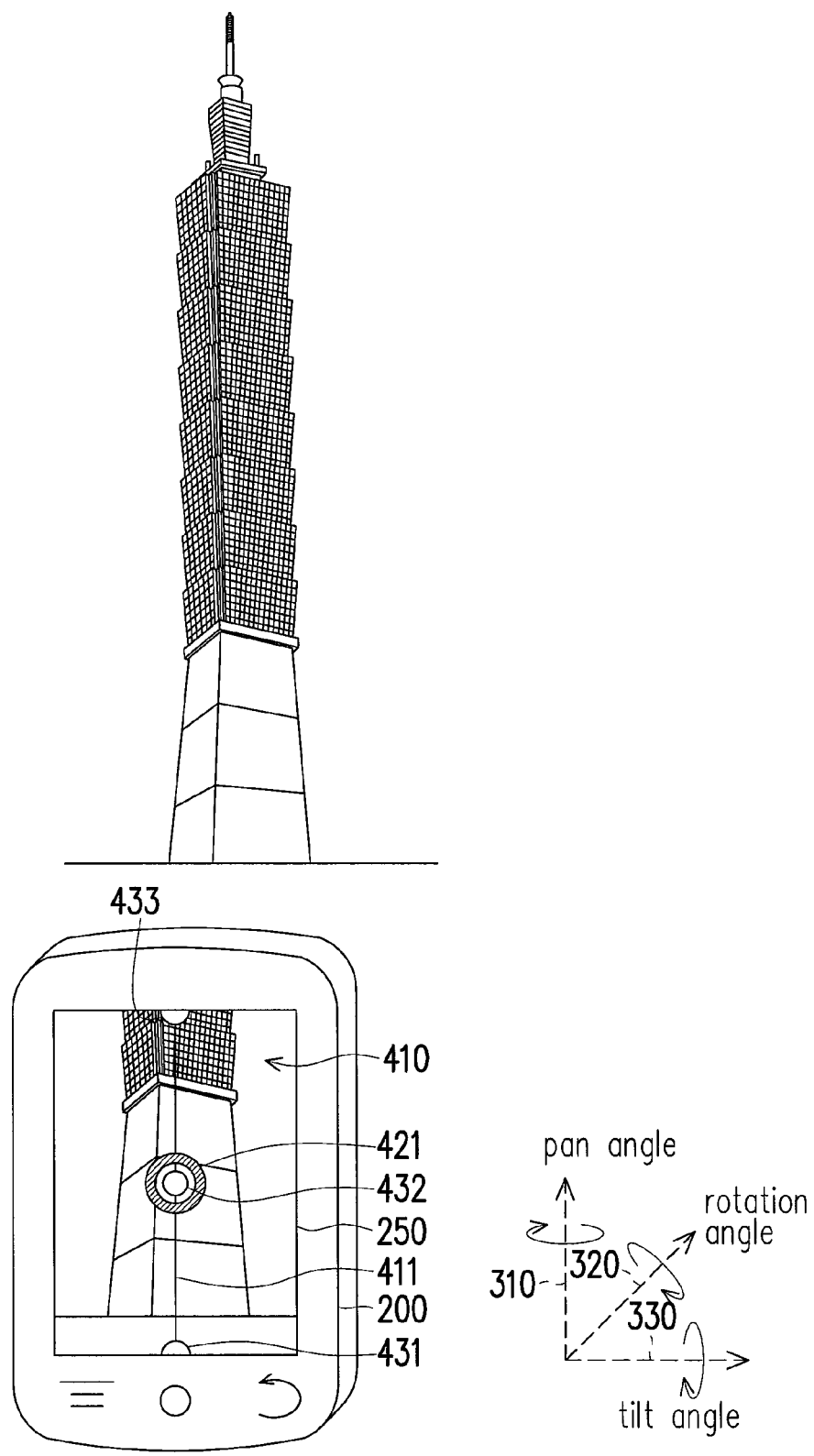
FIG. 9 is schematic diagram illustrating the tilting when taking a panoramic photograph.

FIG. 9 is schematic diagram illustrating the tilting when taking a panoramic photograph.

Referring to FIG. 9, when user wants to take a panoramic photograph of a tall building, the user vertically holds the electric device 200, and the electric device 200 is in a portrait view. The user interface module 360 displays the line 411 vertically across the preview window 410. The user may tilt the electric device 200 to take multiple photos. In the embodiment shown in the FIG. 7, the user interface module 360 moves the graphical objects 431~433 upward or downward according to a obtained tilt angle, and the line 411 is used to determine if the electric device 200 is tilted vertically. While the user is tilting the electric device 200, the posture obtaining module 370 also obtains a moving velocity which indicates how fast the user is tilting. However, the operations of the control unit 210 in the portrait view is similar with that in the landscape view, therefore they will not be repeated below.

In the embodiment, the preview window 410 is a rectangle, and the line 411 is displayed longitudinally across the preview window 410. However, the line 411 may be displayed transversely across the preview window 410, and it is not limited in the invention.

Figure 10:
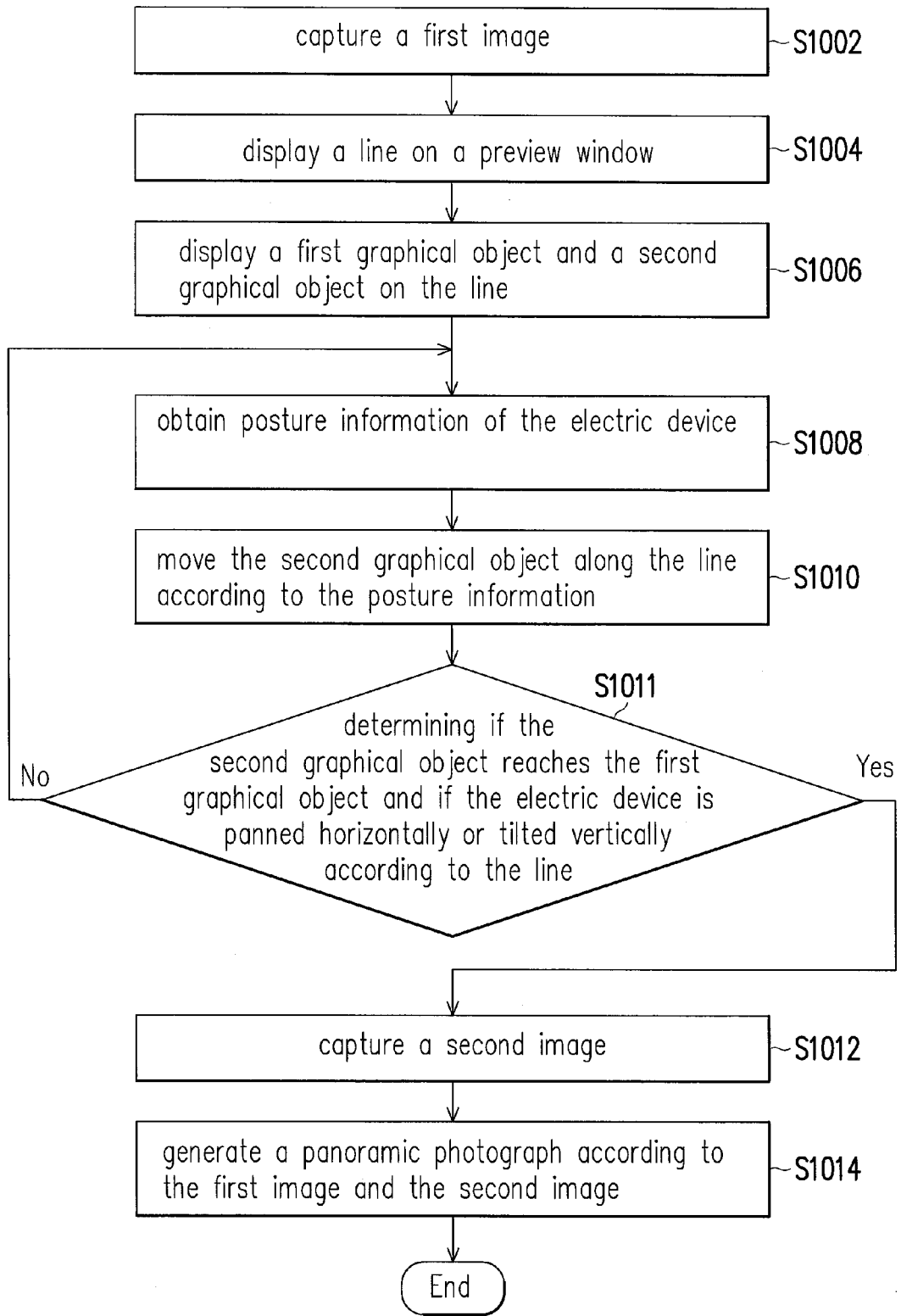
FIG. 10 is a flowchart of a method for an electric device to take a panoramic photograph.

FIG. 10 is a flowchart of a method for an electric device to take a panoramic photograph.

Referring to FIG. 10, in step S1002, the control unit 220 controls the camera module 210 to capture a first image. In step S1004, the control unit 220 displays a line on a preview window. In step S1006, the control unit 220 displays a first graphical object and a second graphical object on the line. In step S1008, the control unit 220 obtains posture information of the electric device from the posture sensor 240. In step S1010, the control unit 220 moves the second graphical object along the line according to the posture information. In step S1011, the control unit 220 determines if the second graphical object reaches the first graphical object and if the electric device is panned horizontally or tilted vertically according to the line. If both of the determining results of step S1011 are "Yes", in step S1012, the control unit 220 controls the camera module 210 to capture a second image. In step S1014, the control unit 220 generates a panoramic photograph according to the first image and the second image. However, each step in FIG. 10 has been described in detail above, so that they will not be repeated.

As described above, embodiments of the invention provide a method and an electric device to take a panoramic photograph, in which a line and a number of graphical objects are displayed to guide a user. Therefore, the user may take the panoramic photograph appropriately.

The previously described exemplary embodiments of the present invention have the advantages aforementioned, wherein the advantages aforementioned not required in all versions of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for an electric device to take a panoramic photograph, the method comprising:
 capturing a first image;
 displaying a first line on a preview window;
 displaying a first graphical object and a second graphical object on the first line, wherein the location of the first graphical object is fixed on the first line;
 obtaining posture information of the electric device;
 moving the second graphical object along the first line according to the posture information;
 determining if the electric device is panned horizontally or tilted vertically;
 capturing a second image when the second graphical object reaches the first graphical object and when the electric device is panned horizontally or tilted vertically; and
 generating the panoramic photograph according to the first image and the second image;
 the method further comprising:
 displaying a second line through the first graphical object on the preview window; and
 rotating the second line about the first graphical object according to a rotation angle of the posture information.

2. The method according to the claim 1, wherein the step of moving the second graphical object along the first line according to the posture information further comprising:
 displaying a third graphical object on the preview window, wherein the third graphical object indicates a first direction opposite to the direction that the second graphical object is moved.

3. The method according to the claim 2, wherein after the step of moving the second graphical object along the first line according to the posture information, the method further comprising:
 obtaining second posture information of the electric device;
 generating a second direction according to the second posture information;
 determining if the second direction is the same with the first direction; and
 when the second direction is not the same with the first direction, displaying an error message on the preview window.

4. The method according to the claim 1, further comprising:
 obtaining a moving velocity of the electric device according to the posture information;
 determining if the moving velocity is larger than a velocity threshold;
 when the moving velocity is larger than the velocity threshold, displaying an error message on the preview window.

5. The method according to the claim 1, wherein the step of displaying the first graphical object and the second graphical object on the first line comprising:
 displaying the first graphical object at the center of the first line, and displaying the second graphical object at an end of the first line.

6. An electric device for taking a panoramic photograph, the electric device comprising:
 a camera module, configured to capture a first image;
 a display unit, configured to display a preview window;
 a posture sensor, configured to obtain posture information of the electric device; and
 a control unit, coupled to the camera module, the display unit, and the posture sensor, wherein the control unit is configured to display a first line on the preview window,
 wherein the control unit is configured to display a first graphical object and a second graphical object on the first line, wherein the location of the first graphical object is fixed on the first line,
 wherein the control unit is configured to move the second graphical object along the first line according to the posture information,
 wherein the control unit is configured to determine if the electric device is panned horizontally or tilted vertically, wherein the control unit is configured to control the camera module to capture a second image when the second graphical object reaches the first graphical object and when the electric device is panned horizontally or tilted vertically, wherein the control unit is configured to generate the panoramic photograph according to the first image and the second image, wherein the control unit is further configured to display second line through the first graphical object on the preview window, and rotate the second line about the first graphical object according to a rotation angle of the posture information.

7. The electric device according to the claim 6, wherein the control unit is further configured to display a third graphical object on the preview window, and the third graphical object indicates a first direction opposite to the direction that the second graphical object is moved.

8. The electric device according to the claim 7, wherein the posture sensor is further configured to obtain second posture information of the electric device, and the control unit is further configured to generate a second direction according to the second posture information, determine if the second direction is the same with the first direction, and display an error message on the preview window when the second direction is not the same with the first direction.

9. The electric device according to the claim 6, wherein the control unit is further configured to obtain a moving velocity of the electric device according to the posture information, determining if the moving velocity is larger than a velocity threshold, and display an error message on the preview window when the moving velocity is larger than the velocity threshold.

10. The electric device according to the claim 6, wherein the control unit is further configured to display the first graphical object at the center of the first line, and display the second graphical object at an end of the first line.

11. The method according to the claim 1, wherein the step of capturing the second image when the second graphical object reaches the first graphical object further comprising:
displaying a pausing sign on the preview window.

12. The electric device according to the claim 6, wherein the control unit is further configured to display a pausing sign on the preview window.

* * * * *